Sept. 20, 1949.　　　　　S. C. BEDELL　　　　　2,482,608
DUMPCART
Filed Jan. 24, 1945
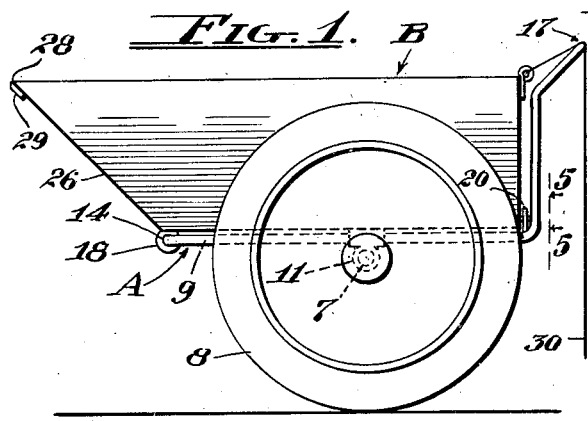
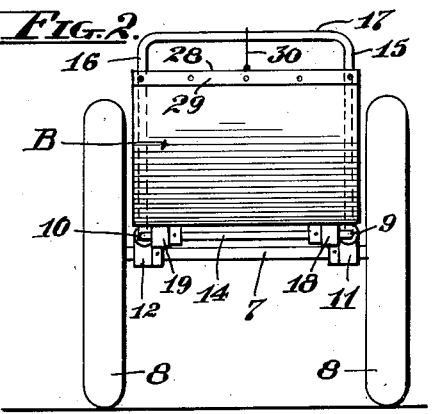
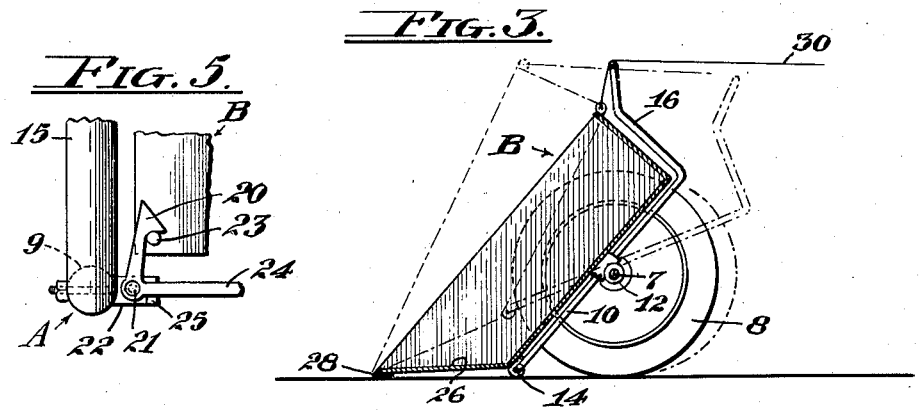
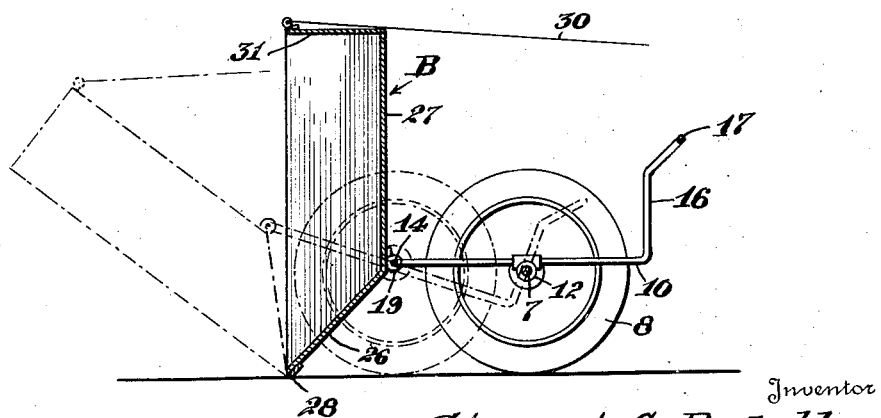
Inventor
Stewart C. Bedell;
By R. S. Berry
Attorney Patented Sept. 20, 1949

2,482,608

UNITED STATES PATENT OFFICE 2,482,608

DUMPCART

Stewart C. Bedell, Big Pine, Calif., assignor of one-half to Antonia Rea, Mount Montgomery, Nev.

Application January 24, 1945, Serial No. 574,357

4 Claims. (Cl. 298—5)

1

This invention relates to a dump cart and particularly pertains to a dumping vehicle of the type embodying a tiltable dump body carried on a chassis and adapted to be swung vertically in and out of a dumping position.

An object of the invention is to provide a construction and arrangement in a dump cart whereby operation of the dump body in moving it to a dumping position may be effected by rocking a chassis in one direction to initially tilt the dump body and then effect up-ending of the dump body by tilting the chassis in the other direction through the medium of leverage afforded by a coaction between the tiltable chassis and the outer end of the dump body.

Another object of the invention is to provide a dump cart of the above character in which the dump body may be readily tilted to any desired extent in dumping the contents thereof whereby the cart may be utilized either in quickly dumping a load in a pile, or in separating the load into a series of piles, or in effecting spreading of a load as by hauling the cart coincident with tilting of the dump body.

Another object of the invention is to provide a dump cart in which the tilting of the dump body to its dumping position is actuated and controlled through the medium of a manually operated lever arrangement.

Another object of the invention is to provide a dump cart which may be manually manipulated with ease both in effecting the dumping operation and in restoration of the dump body to its normal position from its dumped position.

A further object of the invention is to provide a dump cart of the above character comprising few parts which are simple in construction and assemblage.

An additional object of the invention is to produce a dump cart possessing a novel and improved manner of mounting of the dump body on a chassis together with a novel mode of operation.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a view of a dump cart embodying the invention as seen in side elevation with the dump body disposed in its normal loading position;

Fig. 2 is a front elevational view of the cart shown in Fig. 1;

Fig. 3 is a diagram of the dump cart in longi-

2 tudinal section and elevation showing the dump body in an initial tilted position and depicting in broken lines the manner of up-ending the dump body;

Fig. 4 is a diagram similar to Fig. 3 showing the manner of up-ending the dump body from the position shown in Fig. 3, and depicting in broken lines the manner in which the dump body may be inverted;

Fig. 5 is a detail in elevation taken on the line 5—5 of Fig. 1.

Referring to the drawings more specifically, A indicates generally a tiltable chassis here shown as mounted on a cart axle 7 supported at its ends on a pair of wheels 8 journalled on the axle in conventional fashion. The chassis A is here shown as comprising a frame embodying parallel side members 9 and 10 fitted intermediate their ends with bearings 11 and 12 through which the axle 7 is passed in turnable relation thereto whereby the frame may be rocked on the axle. The forward ends of the frame side members 9 and 10 are connected by a front end frame member 14 while the rear ends of the side members 9 and 10 connect with upwardly and rearwardly extending members 15 and 16 leading to a crossmember constituting a handle bar 17.

A dump body B is carried by the frame A and is pivotally attached to the front end of the latter by sleeves 18—19 which are secured to the forward end of the bottom wall of the body B and turnably encompass the end frame member 14 so as to permit vertical swinging of the dump body from the forward end of the frame. Normally the dump body rests on the frame side members 9 and 10 as shown in Fig. 1 and where necessary may be releasably engaged with the chassis to hold it against unwanted tilting thereon in any suitable conventional fashion. The means here shown for this purpose comprises an upstanding dog 20 pivoted at its base at 21 on a bracket 22 carried by the frame member 9, which dog is detachably engageable with a stud 23 on the rear end of the dump body as shown in Fig. 5. The dog is formed with a handle 24 extending horizontally from the pivot 21 and normally resting on a stop 25 on the bracket 22. Lifting the handle 24 releases the dog and frees the dump body.

An important feature of the invention resides in arranging the forward end wall 26 of the dump body at an outward inclination relative to the bottom wall 27 thereof with such end wall leading from contiguous the pivotal connection between the dump body and the chassis, and with the end wall 26 terminating in a lip 28 preferably reinforced by bar 29. It will be observed that this arrangement in effect affords in conjunction with the chassis A a toggle one member of which comprises the chassis and the other member of which comprises the end wall 26, with the sleeves 18 and 19 constituting the pivotal connection between the members. In order to effect the desired operation in tilting the dump body B in discharging the contents thereof and particularly in restoring the dump body to its initial horizontal position, the chassis A is extended forwardly from its pivotal support afforded by the axle 7 such distance that its forward end will extend farther from such pivotal support than the peripheries of the wheels 8, that is, a distance greater than the distance between the pivotal support of the chassis and the ground, whereby the front end of the chassis may be brought in contact with the ground on forward tilting of the chassis. The pivotal connections between the dump body B on the forward ends of the chassis is thus located outwardly relative to the peripheries of the wheels. This toggle-like arrangement is effective in tilting the dump body to its upright and inverted positions as will presently appear.

As a means for restraining tilting of the dump body and also for retracting it from its forwardmost tilted position a rope 30 is attached to the upper portion of the rear end wall 31 of the dump body, which rope leads rearwardly to and is grasped by the operator who feeds it out or pulls it in as occasion requires.

In the operation of the invention the dump body is disposed in its loading position shown in Fig. 1 in which it may be manually held or may have either or both of its ends supported by any suitable supporting means such as props during the loading operation. Unloading of the dump body may be effected in several ways according to requirements. Where the materials to be unloaded are to be spread over a surface, as in applying fertilizer, the chassis A is tilted to drop the inclined outer end of the dump body to such extent as to cause the materials to discharge over the lip 28 and at the same time the cart is either pulled or pushed to effect spreading of the materials.

In dumping the materials the chassis A is tilted so that the inclined end 26 of the dump body rests upon the ground as shown in full lines in Fig. 3 which if the dump body was full at the start will effect discharge of a portion of the contents of the dump body. To effect dumping of more of the materials the dump body is raised on its outer end as indicated in broken lines in Fig. 3 by downward pressure on the handle bar so as to rock the chassis A and elevate the forward end thereof, the chassis then acting as a lever to pry the then lower end of the dump body upward with the lip 28 of the latter bearing on the ground and acting as a fulcrum. During this operation either the wheels 8 move slightly rearward or the lip 28 advances to permit the requisite arc of travel of the pivoted connection between the dump body and the chassis. Continued movement of the parts as just described will bring the dump body to the up-ended position shown in Fig. 4 which ordinarily will effect discharge of the materials from the dump body.

A hoe or shovel may be used when the dump body is in the full line position of Fig. 3 to withdraw therefrom the exact amount of material desired. When the dump body is in its up-ended position on initial dumping thereof, the forward edge 28 will be imbedded in a portion of the dumped materials the weight of which will tend to hold the edge 28 against the ground, while the forward end portion of the chassis A will extend horizontally which will tend to hold the dump body against swinging rearwardly and to maintain the cart stationary. However, the cart may then be easily held against rearward movement by the operator or if need be by blocking the wheels.

If it is desired to invert the dump body after bringing it to its upright position such may be accomplished by advancing the wheeled chassis and at the same time elevating the forward end thereof as indicated in broken lines in Fig. 4.

In restoring the dump body B to its initial loading position from either of its dumping positions shown in broken lines in Figs. 3 and 4 and in full lines in Fig. 4, the chassis A is tilted forward to bring the front end thereof into contact with the ground thus swinging the pivotal connection between the dump body B and the chassis A downwardly with the forward edge 28 of the dump body acting as a fulcrum or pivotal point on which the dump body will swing with its entire weight imposed thereon. This movement of the dump body may be augmented by the operator exerting a pull on the rope 30, particularly where the dump body has been tilted to a forwardly inclined position as indicated by the broken lines in Fig. 4. The instant that the dump body swings rearwardly and downwardly past the vertical position shown in Fig. 4, the forward end portion of the chassis A will incline downwardly and tend to move downwardly under the weight of the dump body which may then gravitate to its seated position in the chassis shown in Fig. 3. This restoring operation is facilitated by the action of materials in the dump body bearing on the front end thereof and holding and temporarily anchoring it against the ground. The swinging of the chassis and shifting of the dump body to swing it back past the vertical is aided by movement of the cart on its wheels either forward or back. In some instances the desired operation of swinging the up-ended chassis back past the vertical may be effected by drawing the cart rearward on its wheels and at the same time allowing the weight of the dump body then imposed on the forward end of the chassis to swing the latter to its inclined position. It will now be seen that the dump body will automatically gravitate to its seated position on the chassis shown in full lines in Fig. 3 which action may be regulated if need be by the operator opposing upward swinging movement of the rear end portion of the chassis. When the parts are positioned as shown in full lines in Fig. 3, the forward end of the dump body and the forward end of the chassis will rest on the ground and the bottom of the dump body will be seated on the then inclined chassis. The operator may then swing the chassis on the axle 7 to raise the forward end thereof and elevate the dump body clear of the ground so as to dispose the dump body in its loading position.

The dump cart as here shown is especially applicable for use as an ore car in hauling ore in tunnels and for which purpose obviates the use of rails as are ordinarily used in mining operations. However, the cart has general utility in hauling materials to be dumped or spread.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In a dump cart, a dump body having an outwardly extending inclined forward end wall, a chassis pivotally supported intermediate its ends in spaced relation to the ground, said chassis having its forward end portion extending from its pivotal support a distance greater than the distance between the pivotal support and the ground whereby the chassis may be positioned with its forward end in engagement with the ground, a pivotal connection between the forward end of said chassis and said dump body contiguous the base of the inclined end thereof on which said dump body may swing relative to said chassis to and from a position wherein said end wall overlies the ground in a flatwise manner, and handle means on the other end of said chassis.

2. In a dump cart embodying a wheel supported axle, a chassis pivoted intermediate its ends on said axle to swing vertically thereon, and a handle on one end of said chassis; a dump body, an outwardly extending inclined end wall at one end thereof, a pivotal connection between the outer end of said chassis and said dump body contiguous the base of the inclined end thereof on which said dump body may be swung vertically relative to said chassis, the outer margin of said end wall forming a fulcrum when engaged with the ground on which the dump body may be swung to and from an up-ended and inverted position by rocking said chassis, the outer end of said chassis being located farther from the axle than are the peripheries of the wheels of the cart.

3. In a dump cart, a frame having side members and a front end member, an axle, wheels supporting said axle, a pivotal connection between the side frame members and said axle, a handle bar, connections between said handle bar and said frame side members opposite said front end member, a dump body, a forwardly inclined end on said dump body, sleeves on said dump body adjacent the base of said inclined end wall pivotally engaging said front end member, said front end member and sleeves being located farther from said axle than the peripheries of said wheels and a ground engaging member at the outer margin of said inclined end wall for forming a fulcrum when engaged with the ground on which the dump body may be swung to and from an up-ended position.

4. In a dump cart embodying a wheel supported axle, a chassis pivoted intermediate its ends on said axle to swing vertically thereon, and a handle on one end of said chassis; a dump body, an outwardly extending inclined end wall at one end thereof, a pivotal connection between the outer end of said chassis and said dump body contiguous the base of the inclined end thereof on which said dump body may be swung vertically relative to said chassis, the outer margin of said end wall forming a fulcrum when engaged with the ground on which the dump body may be swung to and from an up-ended and inverted position by rocking said chassis, said outer end of said chassis being located farther from the axle than are the peripheries of the wheels of the cart, and said inclined end wall being positionable in an overlying relation to the surface of the ground when said end frame member is in contcat therewith.

STEWART C. BEDELL.

REFERENCES CITED

The following references are of record in the file of this patent:

UNITED STATES PATENTS

| Number | Name | Date |
|---|---|---|
| 366,428 | Reilly | July 12, 1887 |
| 371,743 | Evans | Oct. 18, 1887 |
| 677,467 | Potter | July 2, 1901 |